United States Patent
Watanabe

(10) Patent No.: US 6,278,318 B1
(45) Date of Patent: Aug. 21, 2001

(54) BOOSTER CIRCUIT ASSOCIATED WITH LOW-VOLTAGE POWER SOURCE

(75) Inventor: Toshio Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/504,591

(22) Filed: Feb. 15, 2000

(30) Foreign Application Priority Data

Feb. 15, 1999 (JP) .................................................. 11-035602

(51) Int. Cl.[7] ......................................................... G05F 1/10
(52) U.S. Cl. .............................................................. 327/536
(58) Field of Search ..................... 327/530, 534, 327/535, 536

(56) References Cited

U.S. PATENT DOCUMENTS 5,140,182 * 8/1992 Ichimura ........................... 307/296.1
5,589,793 * 12/1996 Kassapian ........................... 327/536
5,801,569 * 9/1998 Pinkham ............................. 327/333

* cited by examiner

*Primary Examiner*—Jeffrey Zweizig
(74) *Attorney, Agent, or Firm*—McGinn & Gibb, PLLC

(57) ABSTRACT

There is provided a booster circuit which can feed a power source to a control circuit to enable operation with a low-voltage input power source when a power supply is turned on.

A charge pump circuit comprises: four capacitors C1, C2, C3 and C4 provided between an input power source (VDD) line 20 and a ground; switches for charging 30 and 32 connected to both ends of the capacitor C1; switches 34 and 36 for charging connected to both ends of the capacitor C2; switches 38 and 40 for charging connected to both ends of the capacitor C3; switches for charging 42 and 44 connected to both ends of the capacitor C4; switches for boosting 46, 48, 50, 52 and 54; and a capacitor C5 for holding an output voltage. The ON/OFF changeover of each switch is controlled by a control circuit.

12 Claims, 5 Drawing Sheets

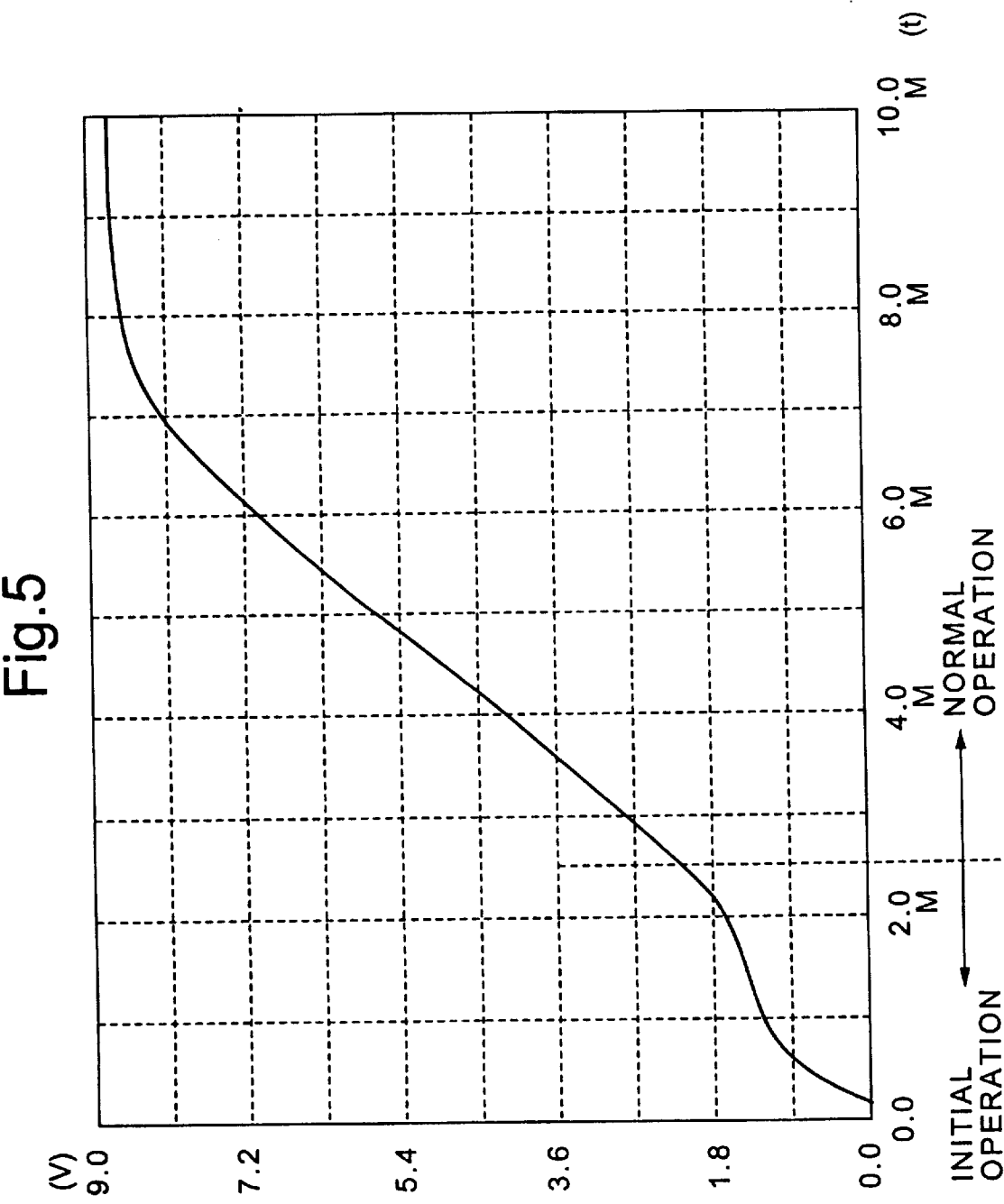

BOOSTER CIRCUIT ASSOCIATED WITH LOW-VOLTAGE POWER SOURCE

BACKGROUND OF THE INVENTION

1. Field of the Invention

The present invention relates to a booster circuit, and more particularly to a booster circuit for use in an LCD (liquid crystal display) controller driver and a driving method thereof.

2. Description of the Related Art

An LCD controller driver is constituted by: a low-voltage circuit section made up of an interface circuit with a CPU, a display control circuit, a memory circuit and the like for storing a content of display; and a high-withstand-voltage circuit section made up of a voltage generating circuit, and LCD driving circuit and others.

The LCD controller driver is used in the LCD unit in a battery-driven portable device such as a cellular phone or a pocket beeper. Therefore, the LCD controller driver contains a voltage generating circuit so as to operate with a single power source. For example, the conventional LCD controller driver contains a charge pump circuit using an external capacity and generates an input power source voltage of 3 V to 9 V (three-fold boosting) or a booster voltage of 12 V (four-fold boosting) to be sued as a power source for the LCD driving circuit.

In a device such as a cellular phone, two lithium-ion batteries (1.8 V) are connected in series to supply 3.6 V to the device. Although the voltage of the battery is lowered with the lapse of operating time, since reduction in power supply voltage of the LCD controller driver affects the display of the LCD, the 3 V voltage is supplied to the LCD controller driver through a constant voltage circuit (regulator circuit) so as not to be influenced by reduction in voltage. If the accuracy of the constant-voltage circuit is ±10%, the LCD controller driver must operate with the voltage in a range of 2.7 V to 3.3 V.

The long operation with the battery is required as the market need, and the low-consumption power and the low voltage have been advance. For example, there is such a tendency as that the operating time of the battery is substantially prolonged by using two batteries of 1.2 V to reduce the voltage to 2.4 V. On the other hand, a voltage for driving the LCD depends on the property of the LCD panel, and 6 to 11 V is required irrespective of the voltage of the battery.

In regard to such a demand, although a threshold voltage is lowered with the refinement of the process and the low-voltage circuit section can operate with the low voltage, the voltage of 6 to 11 V is usually required as a voltage for driving the LCD and the withstand voltage of 14 to 15 V must be assured for the high-withstand-voltage transistor constituting the high-withstand-voltage circuit section, which results in difficulty of reduction in the threshold voltage together with the refinement of the high-withstand-voltage transistor.

Therefore, the booster circuit associated with reduction in voltage of the battery is required. The booster circuit is constituted by a charge pump circuit and a control circuit which generates a clock supplied to a gate of a MOS transistor forming the charge pump circuit and controls the operation of the charge pump circuit. Such a booster circuit is provided in the high-withstand-voltage circuit section, and supply of power is necessary for operating the control circuit for the booster circuit. Although the control circuit usually operates with a high voltage generated by the charge pump circuit as a power source voltage, there is no power source voltage supplying means to the control circuit when turning on the power supply. Accordingly, the control circuit does not normally operate at this rate, and a clock can not be supplied to the charge pump circuit, which does not activate the booster circuit. As a countermeasure, in the prior art, a voltage is supplied from an input power source (VDD) line to a high-voltage power source (VLCD) line through a diode in the charge pump circuit as power source voltage supplying means to the control circuit so that this voltage is supplied to the control circuit as a power source.

When turning on the power supply of the booster circuit (initial operation), the voltage is supplied from the input power source (VDD) line to the high-voltage power source (VLCD) through the diode, and the high-voltage power source (VLCD) line receives a voltage (VDD-VF) which is lower than the input voltage (VDD) by a forward voltage (VF) of the diode in the prior art booster circuit using the supplied voltage as the power source for the control circuit. However, when the input power source voltage is lowered by reduction in voltage of the battery, the sufficient high-voltage power source for operating the control circuit can not be supplied by this method.

In the conventional booster circuit, although VLCD in the initial operation is 2.3 V (VDD-VF=3 V-0.7 V) when VDD is 3 V, the threshold voltage of the high-withstand-voltage transistor is approximately 0.7 to 1 V and the operation can be satisfactorily enabled with 2.3 V. However, if the input power source voltage is lowered when VDD=2 V (1.8 to 2.2 V when the power source accuracy is ±10%), VLCD becomes 1.3 V and the high-withstand-voltage transistor can not be normally operated. Thus, the high-withstand-voltage transistor constituting an inverter of the control circuit and others can not operate, a clock generated by an oscillating circuit can not be propagated to the gate of the MOS transistor for the charge pump circuit.

As described above, since the necessary high-voltage power source can not be supplied to the control circuit in the prior art booster circuit when the input power source voltage (VDD) is lowered, the booster circuit can not be activated.

SUMMARY OF THE INVENTION

It is therefore an object of the present invention to provide a booster circuit which can supply a power source to a control circuit when turning on a power source and operate with a low-voltage input power supply.

Further, it is another object of the present invention to operate a charge pump circuit by providing two types of clock having different voltage levels in a control circuit in order to facilitate the operation when turning on the power supply of the booster circuit.

According to the present invention, there is provided a booster circuit comprising: a charge pump circuit which charges a plurality of capacitors with an input power source and connects a plurality of the charged capacitors for boosting to supply a high-voltage power source; and a control circuit for controlling first clocks having a voltage level of the high-voltage power source, the first clock corresponding to clocks for charging and boosting switches for performing charging and boosting of the charge pump circuit, wherein the charge pump circuit includes a circuit for charging and boosting the capacitor in a first step during the initial operation of the booster circuit and this circuit is operated with second clocks having the voltage level of the input power source.

The control circuit controls: a plurality of capacitors; a first switch group for charging and boosting which charges a plurality of the capacitor with an input power source and connects a plurality of the charged capacitors in series to boost a voltage to a high-voltage power source; second switches for charging and boosting in the first switch group, connected in parallel to the first switches which perform charging and boosting of a capacitor in a first step in a plurality of the capacitors with the input power source; a diode provided between one end of the capacitor in the first step and a line of the high-voltage power source; and first clocks for charging and boosting which are clocks for controlling opening/closing of the first switch group and have a voltage level equal to that of the line of the high-voltage power source and second clocks for charging and boosting which are clocks for controlling opening/closing of the second switches and have a voltage level equal to that of the input power source during a boosting initial operation.

Further, the control circuit comprises: an oscillating circuit for generating two-phase clocks having a voltage level equal to that of the input power source; a level shifter for converting levels of the two-phase clocks to form first clocks for charging and boosting; a first inverter row for propagating the first clock for charging; a second inverter row for propagating the first clock for boosting; a third inverter row for propagating one of the two-phase clocks as the second clock for charging; and a fourth inverter row for propagating the other two-phase clock as the second clock for boosting, the first and second inverter rows using the high-voltage power source as a power source.

When the voltage level of the high-voltage power source is insufficient for the operation, the first and second inverter rows fix the second clock from the level shifter to "L" or "H."

When the charging switch connected to the input power source line of the capacitor in the first step is a P-channel MOS transistor, the diode serves as a parasitic diode of the switch.

The above and other objects, features and advantages of the present invention will be more apparent from the following description taken in conjunction with the accompanying drawings.

BRIEF DESCRIPTION OF THE DRAWINGS

FIG. 5 is a view for explaining a leading edge of VLCD.

DETAILED DESCRIPTION OF THE PREFERRED EMBODIMENT

In general, a charge pump circuit is a circuit which combines a capacitor charged by an input power source with a capacitor charged by using the former capacitor and connects these capacitors with each other to obtain a predetermined booster voltage.

The present invention will now be described taking a charge pump circuit for connecting a plurality of capacitors charged by an input power source in series for boosting as an example.

Figure 1:
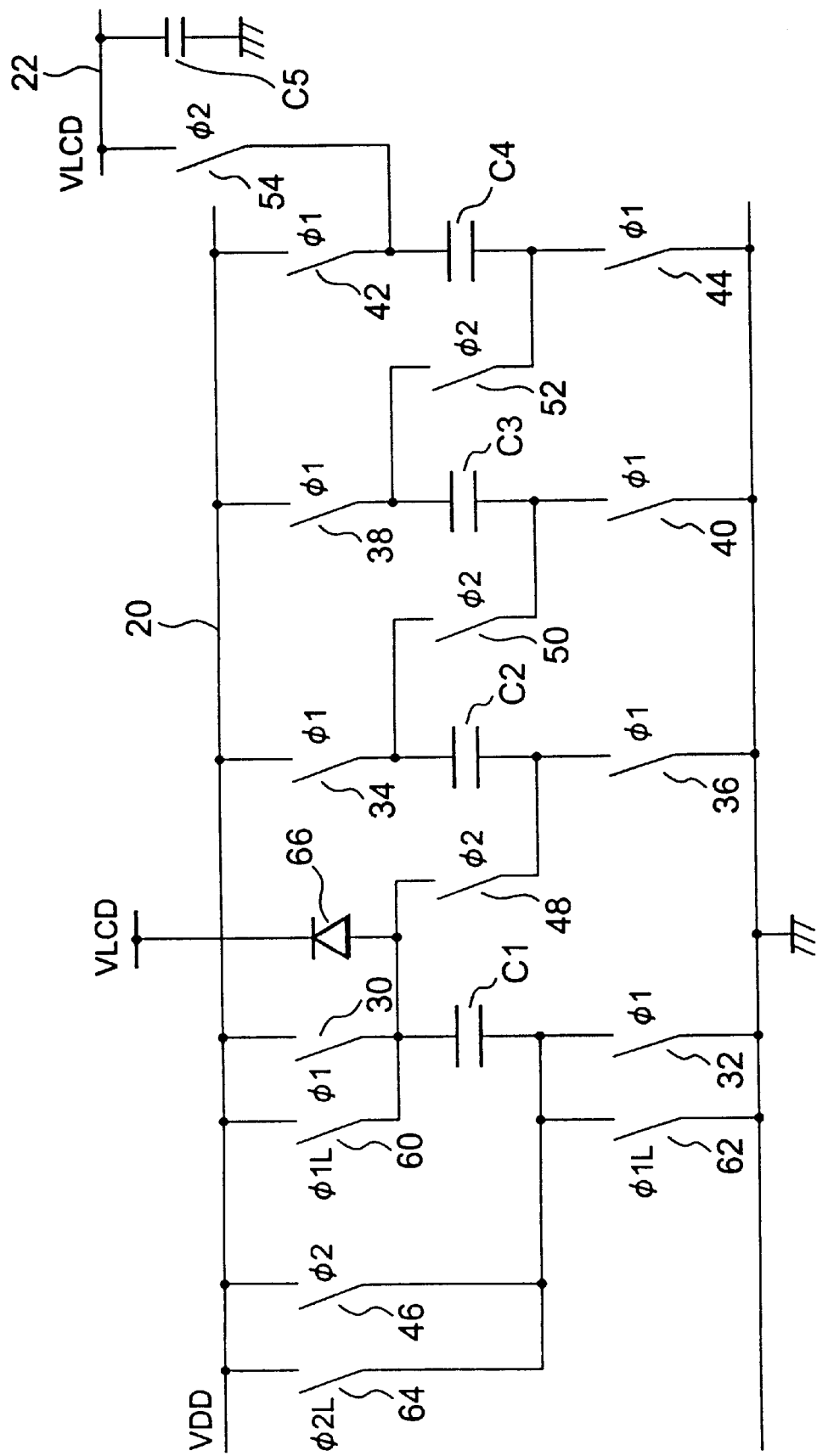
FIG. 1 is an equalizing circuit diagram which is an example of a charge pump circuit constituting a booster circuit according to the present invention.

FIG. 1 is an equalizing circuit diagram as an example of a charge pump circuit constituting a booster circuit according to the present invention. This charge pump circuit comprises: four capacitors C1, C2, C3 and C4 provided between an input power source (VDD) line 20 and a ground; switches for charging 30 and 32 connected to the both ends of the capacitor C1; switches for charging 34 and 36 connected to the both ends of the capacitor C2; switches for charging 38 and 40 connected to the both ends of the capacitor C3; switches for charging 42 and 44 connected to both ends of the capacitor C4; switches for boosting 46, 48, 50, 52 and 54; and a capacitor C5 for holding an output voltage. This charge pump circuit can realize five-fold boosting (5×VDD).

The ON/OFF changeover of the switches for charging is controlled by a clock $\phi 1$ generated by a later-described control circuit and ON/OFF changeover of the switches for boosting is controlled by a clock $\phi 2$ generated by the later-described control circuit.

The above-described structure is the same with that of the prior art charge pump circuit.

In addition to the conventional structure described above, the charge pump circuit of the booster circuit according to the present invention includes: switches 60 and 62 for charging the capacitor C1 in a first step; a switch 64 for discharging the capacitor C1 in the first step; and a diode 66 for supplying a voltage of the capacitor C1 to a high-voltage power source (VLCD) line 22.

The switch 60 for the initial operation is connected to the switch 30 in parallel; the switch 62 for the initial operation is connected to the switch 32 in parallel; and the switch 64 for the initial operation is connected to the switch 46 in parallel.

Figure 2:
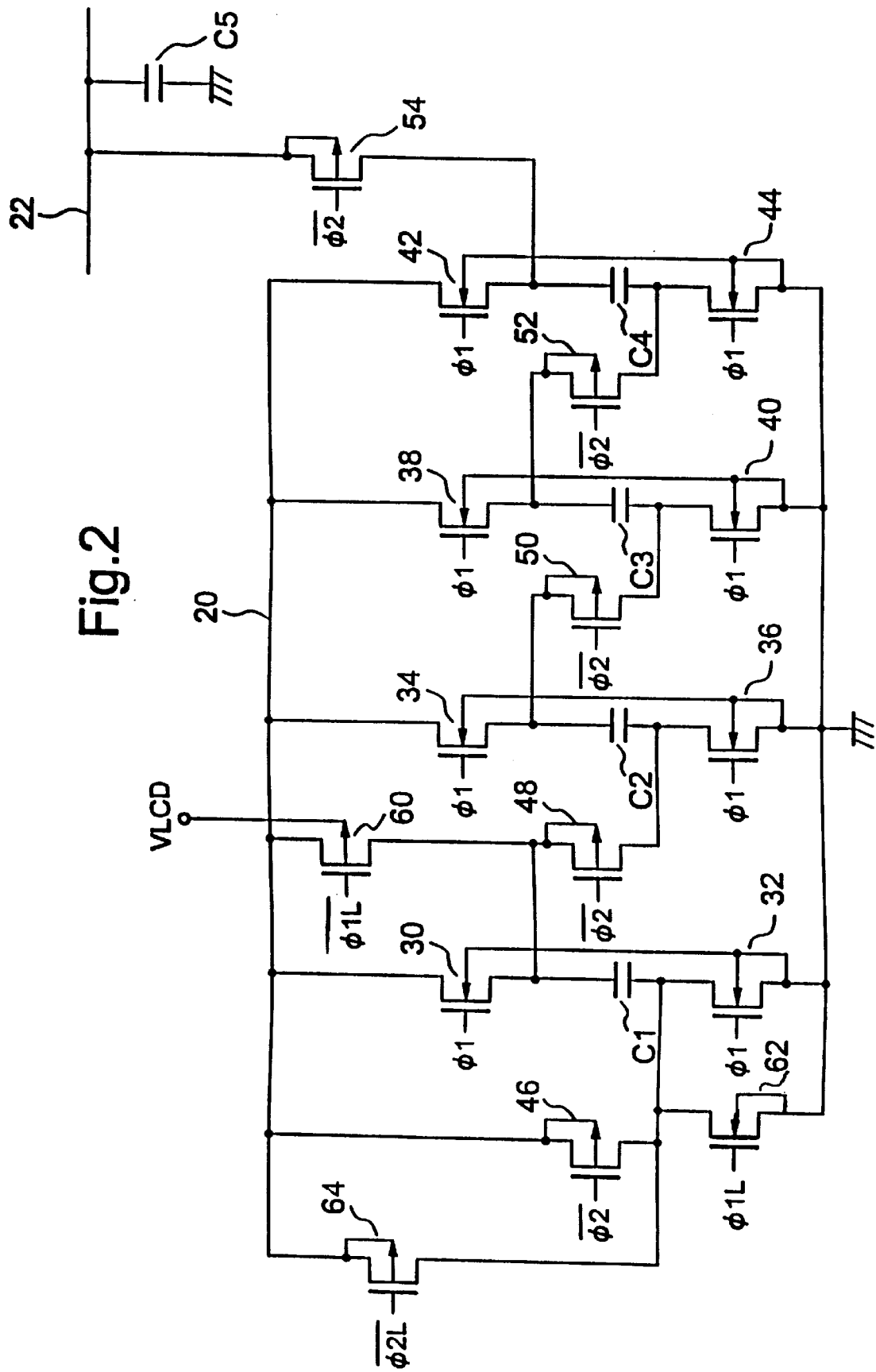
FIG. 2 is a view showing a specific configuration of the circuit illustrated in FIG. 1.

In this structure, the switches are actually made up of MOS transistors. FIG. 2 shows a specific configuration of the circuit depicted in FIG. 1. Reference numerals used in FIG. 1 denoted corresponding devices in FIG. 2 for facilitating understanding of the configuration. The switches for charging 30, 32, 34, 36, 40, 42 and 44 are constituted by N-channel MOS transistors, and the switches for boosting 46, 48, 50, 52 and 54 are constituted by P-channel MOS transistors.

The switches for charging 60 and 62 used for the initial operation of the capacitor C1 in the first step are constituted by a P-channel MOS transistor and an N-channel MOS transistor, respectively. The switch for discharging 64 used for the initial operation of the capacitor C1 in the first step is constituted by a P-channel MOS transistor. A parasitic diode of the P-channel MOS transistor 60 is used as the diode 66 shown in FIG. 1. When the N channel is used for the MOS transistor 60, there is no parasitic diode, and hence a diode is to be additionally connected. This diode can be made up of, e.g., a P-channel MOS transistor connecting a source to a gate.

In this structure, the input power source (VDD) line 20 and the high-voltage power source (VLCD) line 22 are connected as shown in the drawing. As will be described later, the high-voltage power source (VLCD) is supplied to the control circuit as a source.

Figure 3:
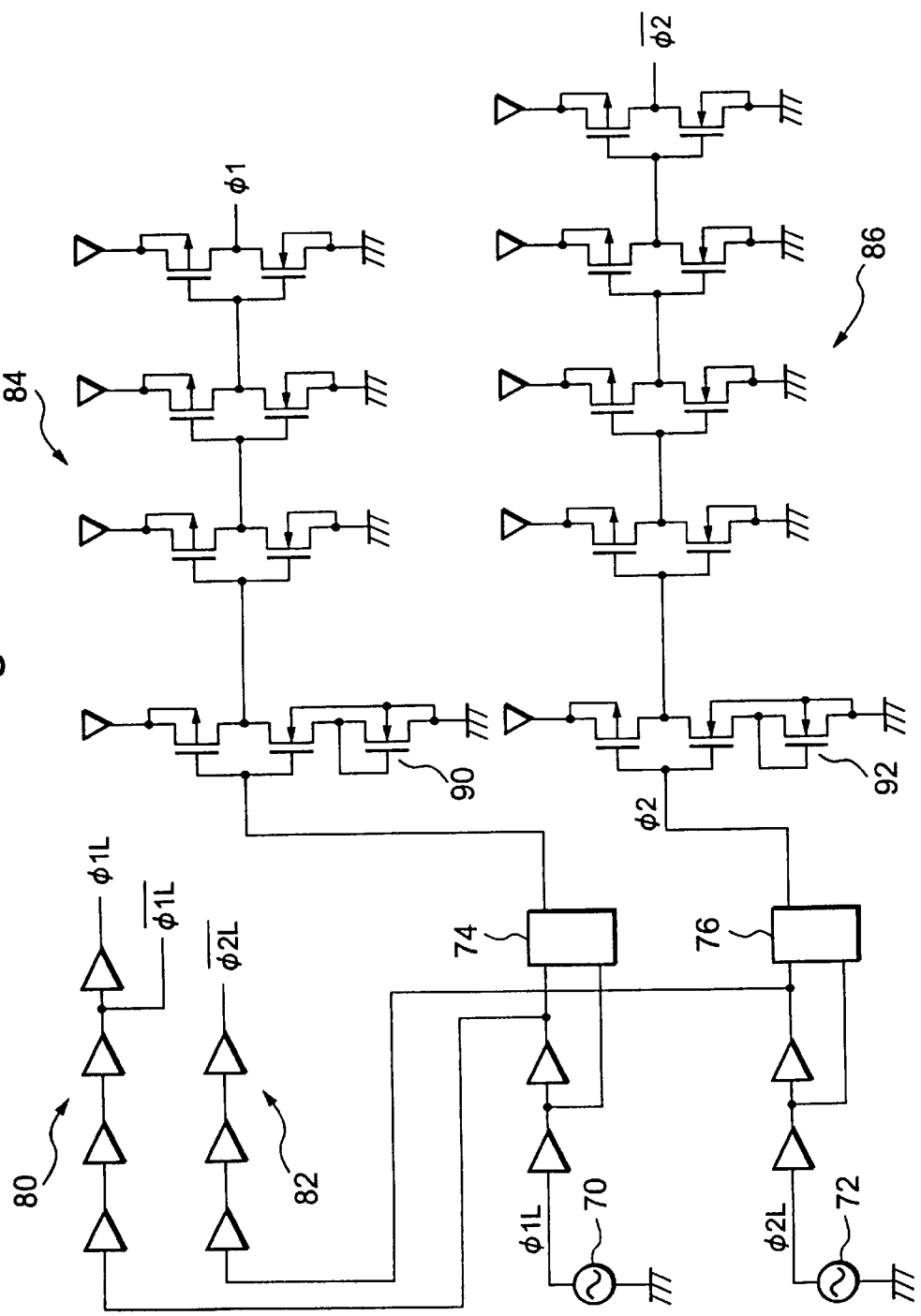
FIG. 3 is a view showing a specific configuration which is an example of a control circuit constituting the booster circuit.

FIG. 3 is a view showing a specific structure as an example of the control circuit constituting the booster circuit. This control circuit includes: oscillators 70 and 72 for generating two-phase clocks $\phi 1L$ and $\phi 2L$ having 0 to VDD levels; inverter rows 80 and 82 for respectively propagating the clocks $\phi 1L$ and $\phi 2L$ having 0 to VDD levels; level shifters 74 and 76 for converting 0 to VDD levels of the clockφ1L and φ2L into 0 to VLCD levels to generate clocksφ1 and φ2; and inverter rows 84 and 86 for respectively propagating the clocksφ1 and φ2 having 0 to VLCD levels outputted from the level shifter 74.

Figure 4:
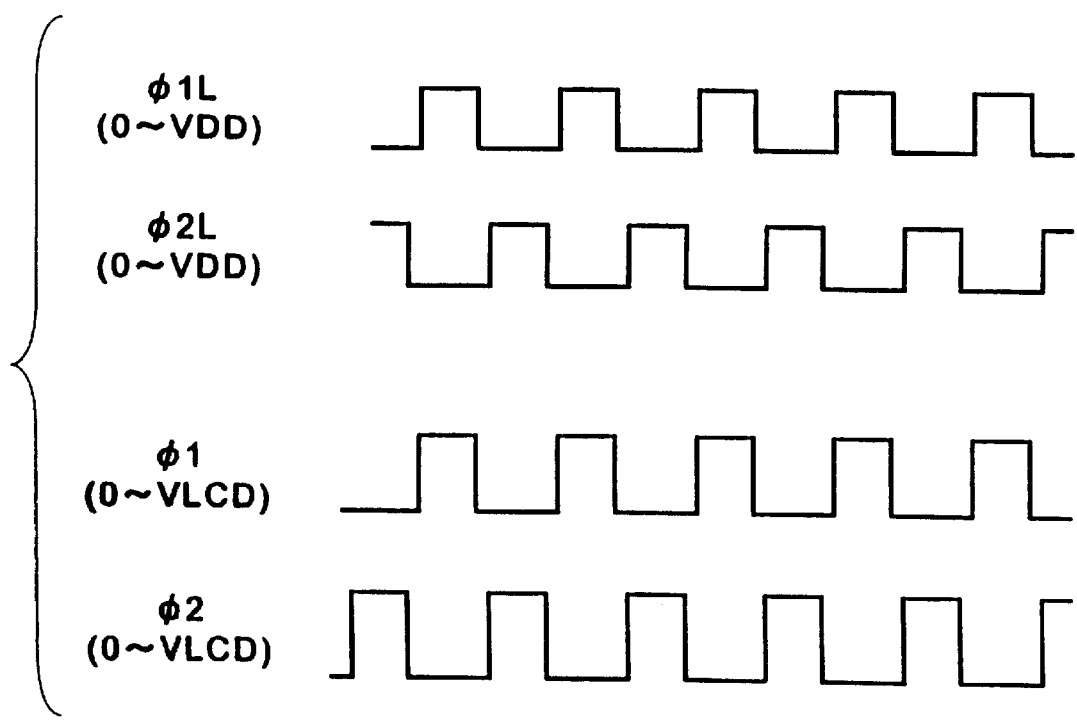
FIG. 4 is a view showing waveforms of respective clocks at the input/output in a level shifter.

FIG. 4 shows waveforms of the respective clocks at the input/output of the level shifters 74 and 76. The timings are set in such a manner that "H" levels of the clocksφ1L and φ2L generated by the clock oscillators 70 and 72 do not overlap one on another. If the timings overlaps one on another, a through-type current flows in the charge pump circuit, which results in malfunction of the circuit.

As power for the level shifters 74 and 76 and the inverter rows 84 and 86, a high-voltage power source (VLCD) outputted by the charge pump circuit is used. The respective inverters 84 and 86 are constituted by P-channel and N-channel high-withstand-voltage MOS transistors, and the high-voltage power supply (VLCD) is given to a source of the P-channel MOS transistor. Therefore, if the voltage of the high-voltage power source (VLCD) is low in the initial operation, the inverter row does not operate and hence the clocksφ1L and φ2L are not propagated. Occurrence of a problem that the charge pump circuit does not operate for this reason has been already described.

On the other hand, as a power source for the inverter rows 80 and 82 for propagating the clocksφ1 and φ2, the input power source (VDD) is used. Since the MOS transistor constituting the inverter is driven with a low voltage, the threshold voltage can be lowered, and hence reduction in voltage of the input battery to some degree can not be an obstacle of the operation.

A polarity of each clock generated by the above-described control circuit is selected in accordance with a channel type of the MOS transistor shown in FIG. 2 and given to a base of the MOS transistor. Specifically, an inverted clockφ1L, the clockφ1L, and an inverted clock φ2L are given to the transistor 60 for the initial operation, the transistor 62 and the transistor 64 shown in FIG. 2, respectively.

On the other hand, the clockφ1 is given to the MOS transistors for charging 30, 32, 34, 36, 38, 40, 42 and 44 used for the normal operation, and the inverted clock φ2 is given to the MOS transistors for boosting 46, 48 50, 52 and 54.

Incidentally, if the channel type of the MOS transistor used for the charge pump circuit is charged, a clock having an appropriate polarity can be fetched from a desired step of the inverter row of the control circuit in response to this.

In the initial operation for charging boosting the capacitor C1, all the MOS transistors that function in the normal operation must be turned off. That is because the initial operation may be failed if the MOS transistors for the normal operation are ON when operating the transistors 60, 62 and 64 for the initial operation.

In order to assure the above-described function, N-channel transistors 90 and 92 each of which connects the gate to the drain and serves as a diode are provided to the inverter in the first step of the inverter rows 84 and 86 in the control circuit illustrated in FIG. 3 so that the electric potential is caused to rise. Thus, an output from the inverter row 84 can be fixed to the "L" level and an output from the inverter row 86 can be fixed to the "H" level enen if the inverter does not operate due to the insufficient power source voltage (VLCD) supplied from the charged pump circuit.

Description will now be given as to the operation of the booster circuit of this embodiment constituted by the charge pump circuit of FIG. 2 and the control circuit of FIG. 3. It is to be noted that the input power source voltage (VDD) is determined as 1.8 V in this embodiment.

FIG. 5 is a graph for explaining the leading edge of VLCD, wherein a vertical axis shows an output voltage of the booster circuit and a horizontal axis shows the time.

In the initial state where the power supply of the booster circuit is turned on, the clockφ1L having 0 to VDD levels is used turn on the MOS transistors for charging 60 and 62, and the capacitor C1 in the first step is charged so that the voltage demonstrates its leading edge to be VDD. The voltage of the capacitor C1 is supplied to the high-voltage power source (VLCD) line 22 through the parasitic diode of the P-channel MOS transistor 60. Therefore, the voltage VLCD corresponds to a value (1.8–0.7—1.1 V) which is lower than the charging voltage VDD by a forward voltage (VF) of the diode, e.g., 0.7 V.

In the next timing in the initial operation, the MOS transistors for charging 60 and 62 are turned off by the clock φ1L having 0 to VDD levels and the MOS transistor for boosting 64 is turned on by the clock φ2L having 0 to VDD levels. The voltage for charging the capacitor C1 is added to the voltage of the input power source (VDD) to be boosted to 3.6 V, and a voltage (1.8×2–0.7=2.9 V) which is obtained by reducing the former voltage by the forward voltage of the parasitic diode is supplied to the high-voltage power source line 22. This voltage is supplied as a power source voltage to the inverter rows 84 and 86 of the control circuit shown in FIG. 3.

In the operation for charging and boosting the capacitor C1 in the initial operation, since all the MOS transistors which function in the normal operation are in the OFF state, the voltage of VLCD assuredly rises to 2.9. The threshold voltage of the high-withstand-voltage transistor is approximately 0.7 to 1 V, and the operation is enabled even if this voltage is 2.9 V. Therefore, the inverter rows 84 and 86 of the control circuit operate to propagate the clocks φ1 and φ2 having 0 to VLCD levels generated by the level shifters 74 and 76. When the clocksφ1 and φ2 begin to be supplied to the charge pump circuit, the charge pump circuit starts the normal operation. That is, the MOS transistors for charging 30, 32, 34, 36, 38, 40, 42 and 44 are turned on; the capacitors C1, C2, C3 and C4 are charged to have the input power source voltage VDD; these MOS transistors for charging are turned off in the next timing; and the MOS transistors for boosting 46, 48, 50, 52 and 54 are turned on to connect these capacitors C1, C2, C3 and C4 in series, thereby obtaining a voltage of approximately 9 V which is five-fold of VDD.

According to the present invention, since the capacitor in the first step is assuredly charged and boosted by using the clocks having the input power source (VDD) level, the booster circuit can be normally operated in the initial operation.

What is claimed is:

1. A booster circuit comprising:
  a charge pump circuit for charging a plurality of capacitors with an input power source and connecting and boosting a plurality of said charged capacitors to provide a high-voltage power source; and
  a control circuit for controlling first clocks having a voltage level of said high-voltage power source, said first clocks corresponding to clocks to switches for charging and boosting said charge pump circuit,
  wherein said charge pump circuit includes a circuit for charging and boosting a capacitor of said plurality of capacitors in a first step in an initial operation of said booster circuit and said circuit operates with second clocks having a voltage level of said input power source.

2. A booster circuit according to claim 1, wherein said circuit comprises: two switches for charging which are respectively connected to both ends of said capacitor in said first step and operate with said second clocks; one switch for boosting which is connected between a line of said input power source and one end of said capacitor in said first step and operate with said second clocks; and a diode which is contiguous between the other end of said capacitor in said first step and a line of said high-voltage power source.

3. A booster circuit according to claim 2, wherein said control circuit comprises: an oscillation circuit for generating two-phase clocks having a voltage level of said input power source; a level shifter for level-converting said two-phase clocks respectively to form said first clocks for charging and boosting; a first inverter row for propagating said first clock for charging; a second inverter row for propagating said first clock for boosting; a third inverter row for propagating one of said two-phase clocks as said second clock for charging; and a fourth inverter row for propagating the other one of said two-phase clocks as said second clock for boosting, said first and second inverter rows using said high-voltage power source as a power source.

4. A booster circuit according to claim 3, wherein said first and second inverter rows fix said second clock from said level shifter to "L" or "H" when a voltage level of said high-voltage power source is insufficient for the operation.

5. A booster circuit according to claim 2, wherein all of said switches comprise high-withstand-voltage MOS transistors.

6. A booster circuit according to claim 5, wherein when a switch for charging connected to the line side of said input power source of said capacitor in said first step comprises a P-channel MOS transistor, said diode comprises a parasitic diode of said switch for charging.

7. A method for driving a booster circuit comprising:

a charge pump circuit for charging a plurality of capacitors with an input power source and connecting and boosting a plurality of said charged capacitors to provide a high-voltage power source; and a control circuit for controlling first clocks having a voltage level of said high-voltage power source, said first clocks corresponding to clocks to switches for charging and boosting said charge pump circuit, said charge pump circuit including a circuit for charging and boosting a capacitor of said plurality of capacitors in said first step in an initial operation of said booster circuit, wherein said circuit is operated with second clocks having a voltage level of said input power source in an initial operation when a power supply is turned on.

8. A method for driving a booster circuit according to claim 7, wherein a voltage obtained by charging and boosting said capacitor in said first step is provided to said high-voltage power source through a diode when said circuit is operated, and said control circuit is operated by using said high-voltage power source as a power source.

9. A booster circuit comprising:

a plurality of capacitors;

a first switch group for charging and boosting which charges a plurality of said capacitors with an input power source and connects a plurality of said charged capacitors in series to be boosted to a high-voltage power source;

second switches for charging and boosting connected in parallel to said first switches in said first switch group which charge and boost a capacitor of said plurality of capacitors in a first step with said input power source;

a diode provided between one end of said capacitor in said first step and a line of said high-voltage power source; and a control circuit for controlling first clocks for charging and boosting having a voltage level equal to that of the line of said high-voltage power source and second clocks for charging and boosting having a voltage level equal to that of said input power source in a boosting initial operation, said first clocks being clocks for controlling opening/closing of said first switch group, said second clocks being clocks for controlling opening/closing of said second switches.

10. A booster circuit according to claim 9, wherein said control circuit comprises: an oscillation circuit for generating two-phase clocks having a voltage level equal to that of said input power source; a level shifter for level-converting said two-phase clocks respectively to form said first clocks for charging and boosting; a first inverter row for propagating said first clock for charging; a second inverter row for propagating said first clock for boosting; a third inverter row for propagating one of said two-phase clocks as said second clock for charging; and a fourth inverter row for propagating the other one of said two-phase clocks as said second clock for boosting, said first nad second inverter rows using said high-voltage power source as a power source.

11. A booster circuit according to claim 10, wherein said first and second inverter rows fix said second clock from said level shifter to "L" or "H" when a voltage level of said high-voltage power source is insufficient for the operation.

12. A booster circuit according to claim 9, wherein when said switch for charging connected to the line side of said input power source of said capacitor in the first step comprises a P-channel MOS transistor, said diode comprises a parasitic diode of said switch for charging.

* * * * *